(12) United States Patent
Ishikawa et al.

(10) Patent No.: US 7,944,176 B2
(45) Date of Patent: May 17, 2011

(54) VOLTAGE ADJUSTING APPARATUS

(75) Inventors: Satoshi Ishikawa, Shizuoka (JP);
Masashi Sekizaki, Shizuoka (JP);
Hajime Okamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 494 days.

(21) Appl. No.: 12/216,133

(22) Filed: Jun. 30, 2008

(65) Prior Publication Data

US 2009/0033282 A1  Feb. 5, 2009

(30) Foreign Application Priority Data

Jul. 31, 2007 (JP) .................................. 2007-198932

(51) Int. Cl.
*H02J 7/00* (2006.01)

(52) U.S. Cl. ........ 320/118; 320/116; 320/119; 320/127; 320/132

(58) Field of Classification Search .................... 320/118
See application file for complete search history.

(56) References Cited

U.S. PATENT DOCUMENTS 6,094,031 A * 7/2000 Shimane et al. ............. 320/118
7,489,112 B2 * 2/2009 Ishikawa et al. ............. 320/161

FOREIGN PATENT DOCUMENTS

JP  2003-189490  7/2003
JP  2005-063054  3/2005

* cited by examiner

*Primary Examiner* — Melissa J Koval
*Assistant Examiner* — Ahmed Omar
(74) *Attorney, Agent, or Firm* — Edwards Angell Palmer & Dodge LLP

(57) ABSTRACT

For providing a reliable voltage adjusting apparatus in low cost, a low-voltage control apparatus controls a high-voltage power supply circuit to be switched power off by transmitting a power-off signal through a second communication line arranged between the high-voltage power supply circuit and itself through an isolation unit when an information signal from an equalizing apparatus is not transmitted within a predetermined first malfunction judging period. The equalizing apparatus stops an equalizing process in itself when the information signal from the low-voltage control unit.

10 Claims, 5 Drawing Sheets

VOLTAGE ADJUSTING APPARATUS

The priority application Number Japan Patent Application 2007-198932 upon which this patent application is based is hereby incorporated by reference.

BACKGROUND OF THE INVENTION

1. Field of the Invention

The present invention relates to a voltage adjusting apparatus, especially a voltage adjusting apparatus used for a hybrid vehicle (HEV) to detect a voltage value of an on-vehicle battery.

2. Description of the Related Art

At present time, a hybrid vehicle driven by usage in parallel of an engine and a motor for traveling has become popular. An electric circuit of the hybrid vehicle includes a low-voltage system for driving the engine and a high-voltage system for driving the motor for traveling. The low-voltage system has an on-vehicle low-voltage battery of 12 volts. The high-voltage system has an on-vehicle high-voltage battery formed by a battery pack in which a plurality of unit cells is connected in series. The high-voltage battery is given a high voltage by connecting in series the plurality of unit cells, which is a secondary battery such as a nickel-metal hydride battery or a lithium cell.

The high-voltage battery after repeating charge and discharge has a dispersion of a voltage value between both electrodes of each unit cell, that is, a dispersion of a State of Charge (SOC). For securing durability of respective unit cells and safety, when the unit cell having the highest SOC (or the highest voltage value between both electrodes) is charged to reach the predetermined upper limit SOC (or upper limit voltage value between both electrodes), it has to be prohibited to charge the high-voltage battery. And, when the unit cell having the lowest SOC (or the lowest voltage value between both electrodes) is discharged to reach the predetermined lower limit SOC (or lower limit voltage value between both electrodes), it has to be prohibited to discharge the high-voltage battery. Therefore, when there is the dispersion of SOC between respective unit cells, an actual available discharging capacity is reduced. In case of an application for HEV, assist drive and regeneration, which assists an engine by consuming energy from the battery on climbing and regenerates energy back to the battery on descending, are not performed. Thereby, running performance and fuel consumption are degenerated.

For a solution, an equalizing apparatus, which adjusts (equalizes) SOC of each of a plurality of unit cells in the high-voltage battery, and thereby improves the dispersion of SOC between each unit cell, is proposed. The equalizing apparatus performs equalizing action by power supply from the low-voltage battery during an ignition switch is OFF, that is during the engine is OFF. Since the equalizing action is performed during the engine is OFF, the low-voltage battery is only discharged without charging. Therefore, when the low-voltage battery is over-discharged by supplying electric power to the equalizing apparatus during the engine is OFF, the low-voltage battery loses energy enough to start the engine.

For solving above problems, another equalizing apparatus, which includes a control unit activated by power supply from the low-voltage battery and controls to stop equalizing action for preventing over-discharging of the low-voltage battery when it is judged by a self-diagnostics of the control unit that a battery voltage of the low-voltage battery is reduced less than a predetermined value, is proposed (in Patent document 1: Japan Patent Application 1 No. 2003-189490).

As another technical idea of self-diagnostics, an electronic control apparatus with self-diagnostics for an air-bag system of the vehicle, which arranges two test circuits for fail-safe monitoring a malfunction of each test circuit to each other when the test circuit self-diagnoses with respect to required functions for controlling the system, and transmits test results and monitoring results through a duplex communication line to a processor for judging, is proposed (Japan Patent Application 2 No. 2005-063054).

SUMMARY OF THE INVENTION

Objects to be Solved

According to the above equalizing apparatus, when the control unit stops functionally during adjusting (equalizing), the equalizing action continues to consume energy of unit cells of the high-voltage battery, so that the high-voltage battery for the motor for traveling may have a malfunction.

Additionally, a cost of the electric control apparatus with self-diagnostics is increased by increasing the number of components because of the duplex communication line.

To overcome the above problem, an object of the present invention is to provide a voltage adjusting apparatus with high reliability by low cost.

How to Attain the Object of the Present Invention

In order to attain the object of the present invention, a voltage adjusting apparatus is characterized in that the voltage adjusting apparatus has a low-voltage system including a low-voltage battery, a low-voltage power supply circuit, a low-voltage control unit driven by power supply through the low-voltage power supply circuit from the low-voltage battery; a high-voltage system including a high-voltage battery formed with a plurality of battery unit cells and having a higher voltage value than the low-voltage battery, a high-voltage power supply circuit, an equalizing unit driven by power supply through the high-voltage power supply circuit from the high-voltage battery, and controlled by the low-voltage control unit, the equalizing unit detecting and equalizing a voltage value between both electrodes of each unit cell of the high-voltage battery as an equalizing process; an isolating unit isolating electrically the low-voltage system and the high-voltage system; a first communication line transmitting an information signal for the equalizing process between the low-voltage control unit and the equalizing unit through the isolating unit; and a second communication line arranged through the isolating unit between the low-voltage control unit and the high-voltage power supply circuit. The low-voltage control unit transmits a power-off signal through the second communication line to the high-voltage power supply circuit when the information signal from the equalizing unit is not transmitted within a predetermined first malfunction judging period, and controls the high-voltage power supply circuit to be switched power off. The equalizing unit stops the equalizing process when the information signal from the low-voltage control unit is not transmitted within a predetermined second malfunction judging period.

In order to attain the object of the present invention, the voltage adjusting apparatus is characterized in that the voltage adjusting apparatus further has a low-voltage timer started by controlling of the low-voltage control unit to count the first malfunction judging period; and a high-voltage timer started by controlling of the equalizing unit to count the second malfunction judging period.

In order to attain the object of the present invention, the voltage adjusting apparatus is characterized in that the equalizing unit includes a voltage detecting circuit detecting the voltage value between the both electrodes of each unit cell of the high-voltage battery and outputting a voltage detect signal; an equalizing circuit including an equalizing element and a switch element, which are connected in series; and a high-voltage control circuit controlling the voltage detecting circuit and the equalizing circuit, and in that the switch element is controlled by the high-voltage control circuit so as to be turned on corresponding to the information signal from the low-voltage control unit, and so as to be turned off when the information signal from the low-voltage control unit is not transmitted within the second malfunction judging period.

In order to attain the object of the present invention, the voltage adjusting apparatus is characterized in that the equalizing unit includes a voltage detecting circuit detecting the voltage value between the both electrodes of each unit cell of the high-voltage battery and outputting a voltage detect signal; a select switch group provided at the voltage detecting circuit and selecting one unit cell from the plurality of unit cells; an equalizing circuit connected through the select switch group in parallel with the selected one unit cell and including an equalizing element and a switch element, which are connected in series; and a high-voltage control circuit controlling the voltage detecting circuit, the select switch group and the equalizing circuit, and the switch element is controlled by the high-voltage control circuit so as to be turned on corresponding to the information signal from the low-voltage control unit, and so as to be turned off when the information signal from the low-voltage control unit is not transmitted within the second malfunction judging period.

In order to attain the object of the present invention, the voltage adjusting apparatus is characterized in that the equalizing unit stops the equaling process by transmitting the power-off signal to the high-voltage power supply circuit and controlling the high-voltage circuit to be switched power off when the information signal from the low-voltage control unit is not transmitted within the second malfunction judging period.

In order to attain the object of the present invention, the voltage adjusting apparatus is characterized in that the low-voltage control unit and the high-voltage control unit respectively include each microcomputer.

Effects of Invention

According to the present invention, the low-voltage system and the high-voltage system monitor about malfunctions to each other, and the voltage adjusting apparatus more reliable can be realized by shifting to a safe action when the malfunction is occurred at the low-voltage system or the high-voltage system. The cost can be reduced by using no duplex fail-safe.

According to the present invention, the self-diagnostics about the malfunction can be performed by the malfunction judging period counted by the timer without effects on the equalizing process.

According to the present invention, the equalizing the voltage value between the both electrodes of each unit cell can be performed safely.

According to the present invention, the number of components can be reduced so that the voltage adjusting apparatus can be built by lower cost.

The above and other objects and features of this invention will become more apparent from the following description taken in conjunction with the accompanying drawings.

DESCRIPTION OF THE PREFERRED EMBODIMENT

Figure 1:
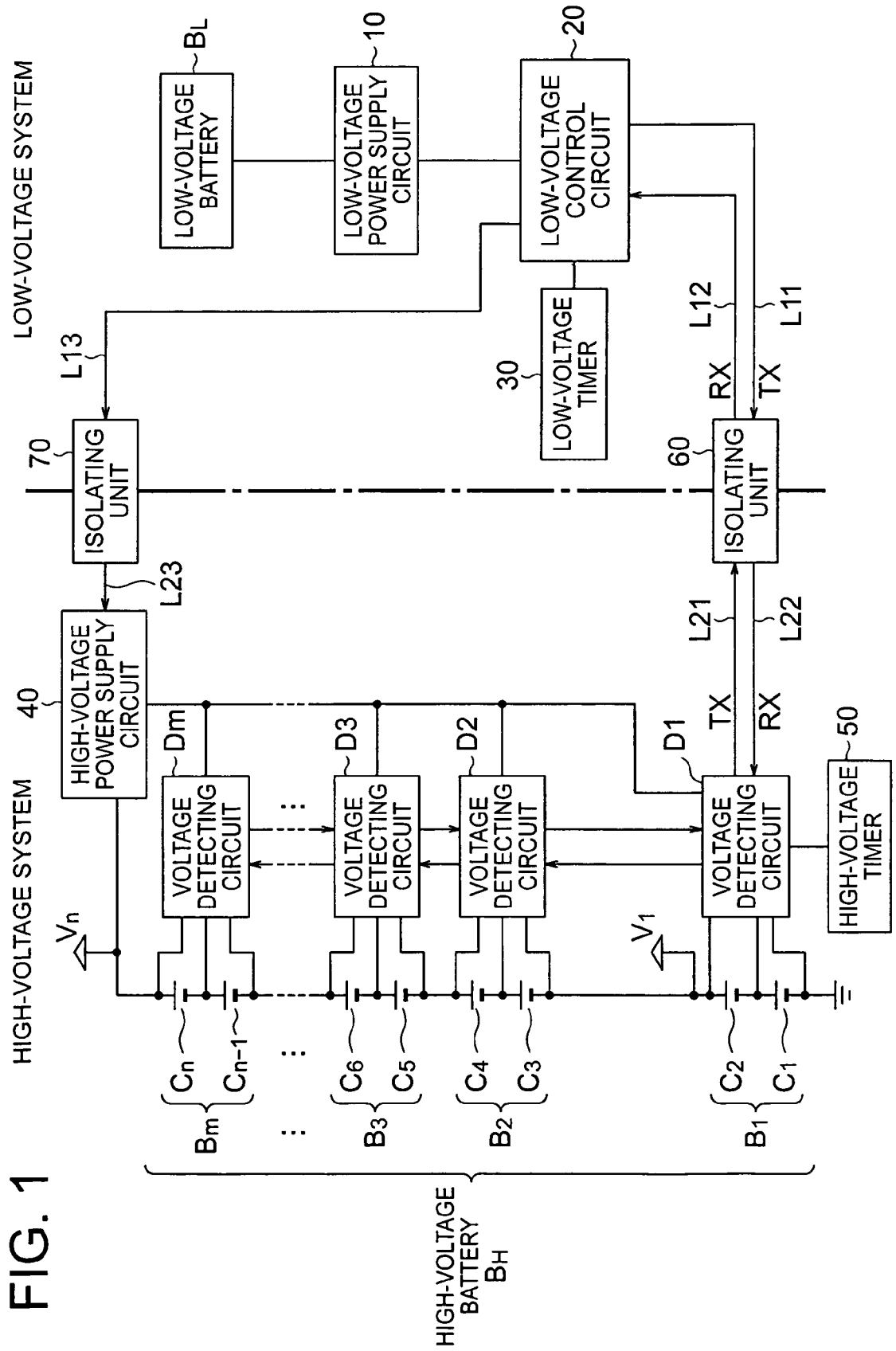
FIG. 1 is a circuit diagram of a first embodiment of a voltage adjusting apparatus according to the present invention.
Figure 2:
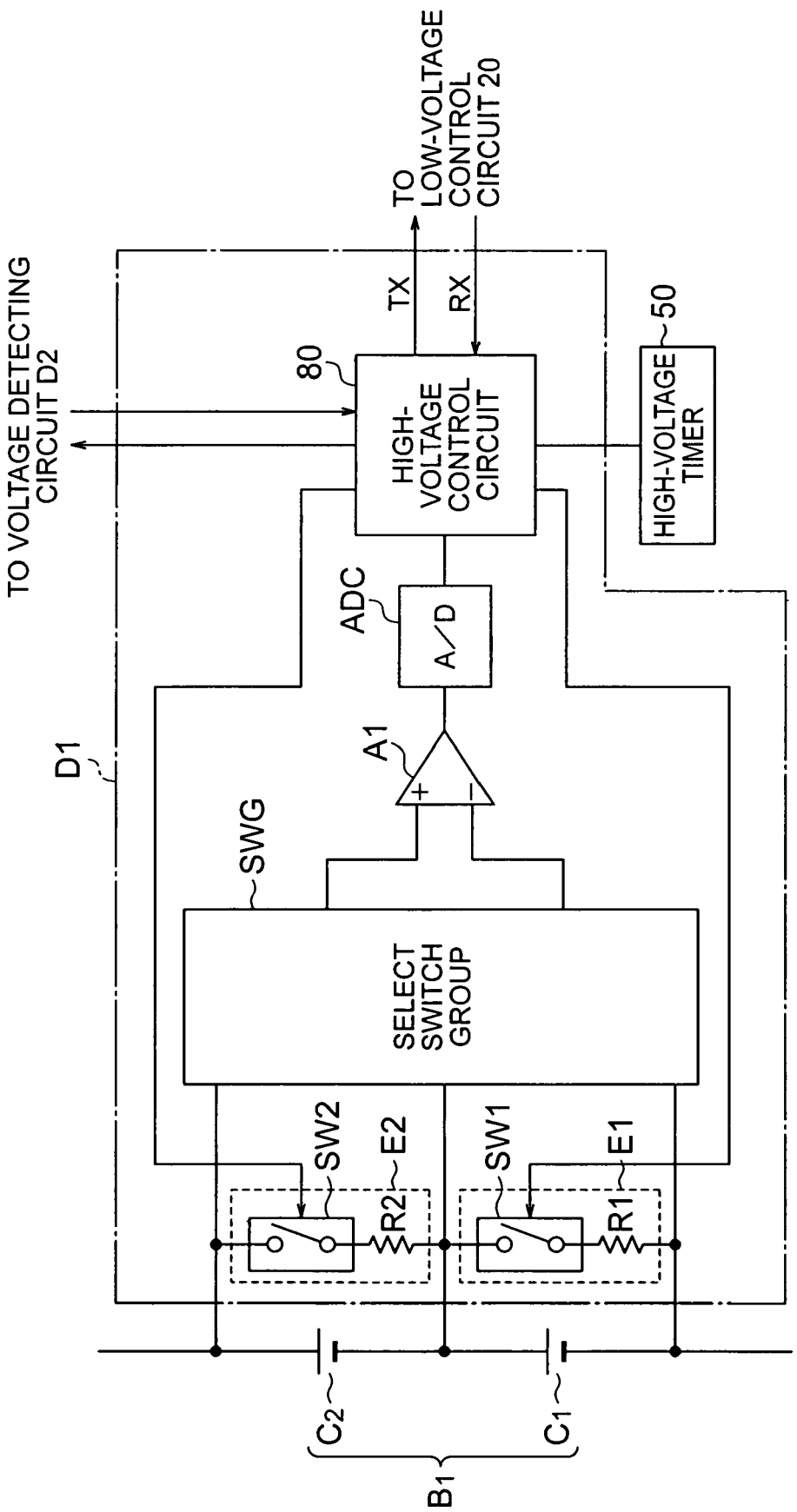
FIG. 2 is a circuit diagram of a voltage detecting circuit of the voltage adjusting apparatus shown in FIG. 1.

FIGS. 1, 2 show an embodiment of a voltage adjusting apparatus according to the present invention.

The embodiment of the present invention will be described with reference to figures.

First Embodiment

FIG. 1 is a block diagram showing a first embodiment of a voltage adjusting apparatus according to the present invention. In FIG. 1, a low-voltage battery (on-vehicle low-voltage battery) BL is formed by one secondary battery. The low-voltage battery BL is used as a power supply for an auxiliary unit, such as a starter (not shown) starting an engine, and connected at both terminals of the battery BL to an alternator (not shown) as a charger according to a requirement.

A high-voltage battery (on-vehicle high-voltage battery) BH is formed as a battery pack, and used as a drive power supply for a drive motor (not shown) of a hybrid engine vehicle (HEV) using in parallel an engine (not shown) and the drive motor for traveling. Both terminals of the battery BH are connected to an alternator (not shown) as a charger according to a requirement.

The high-voltage battery BH is formed with "m" (m: any integer) blocks B1-Bm. Each block B1-Bm includes a plurality of unit cells (for example, two unit cells) C1 and C2, C3 and C4, C5 and C6, - - - Cn-1 and Cn. Each unit cell C1-Cn is formed with second batteries of "x" (x: any integer) pieces.

The voltage adjusting apparatus includes a plurality of voltage detecting circuits D1-Dm, a low-voltage control circuit 20, a low-voltage timer 30 connected with the low-voltage control circuit 20, a high-voltage timer 50 connected with the voltage detecting circuit D1, and isolating units 60, 70. The voltage detecting circuits D1-Dm correspond to an equalizing unit. The low-voltage control circuit 20 corresponds to a low-voltage control unit.

The low-voltage control circuit 20 is structured with a microcomputer including a CPU, a ROM and a RAM, and operated by power supply from a low-voltage power supply circuit 10 for giving a constant voltage from the low-voltage battery BL. Each voltage detecting circuit D1-Dm is arranged corresponding to each block B-Bm, and operated by power supply from a high-voltage power supply circuit 40 for giving a constant voltage from the high-voltage battery BH.

The voltage detecting circuit D1, as shown in FIG. 2, includes a select switch group SWG selecting one unit cell from among unit cells C1, C2 forming the block B1, a differential amplifier A1 detecting a voltage value between both electrodes of the one unit cell selected by the select switch group SWG, an A/D converter ADC digitally converting the voltage value detected by the differential amplifier A1, a high-voltage control circuit 80 controlling the select switch group SWG, and equalizing circuits E1, E2 connected respectively to both electrodes of each unit cell C1, C2.

The high-voltage control circuit 80 is formed with a microcomputer having a CPU, a ROM and a RAM. The high-voltage timer 50 is connected to the CPU. The equalizing circuit E1 is structured with a discharge resistor R1 as an equalizing element, and a switch SW1 as a switch element connected with the discharge resistor R1 in series and controlled about ON/OFF by a control signal from the high-voltage control circuit 80. Similarly, the equalizing circuit E2 is structured with a discharge resistor R2 as an equalizing element, and a switch SW2 as a switch element connected with the discharge resistor R2 in series and controlled about ON/OFF by a control signal from the high-voltage control circuit 80. The voltage detecting circuits D2-Dm is structured as same as the voltage detecting circuit D1 shown in FIG. 2. The respective high-voltage control circuits 80 in the voltage detecting circuits D2-Dm are communicatably connected to each other.

The isolating units 60, 70 isolate electrically a low-voltage system including the low-voltage battery BL and the high-voltage system including the high-voltage battery BH. The isolating units 60, 70 are formed with, for example, a photo-coupler including a light-emission element and a receiving element, or a magnetic coupler. The isolating unit 60 is arranged between the low-voltage control circuit 20 provided power supply from the low-voltage battery BL and the voltage detecting circuit D1 provided power supply from the high-voltage battery BH, and includes a transmitting line L11 and a receiving line L12 between the low-voltage control circuit 20 and itself, and a transmitting line L21 and a receiving line L22 between the voltage detecting circuit D1 and itself. The isolating unit 70 is arranged between the low-voltage control circuit 20 and the high-voltage power supply 40 provided power supply from the high-voltage battery BH, and includes a transmitting line L13 between the low-voltage control circuit 20 and itself, and a transmitting line L23 between the high-voltage power supply circuit 40 and itself. A set of the transmitting lines L11, L21 and the receiving lines L12, L22 corresponds to a first communication line. A set of transmitting lines L13, L23 corresponds to a second communication line.

Figure 3:
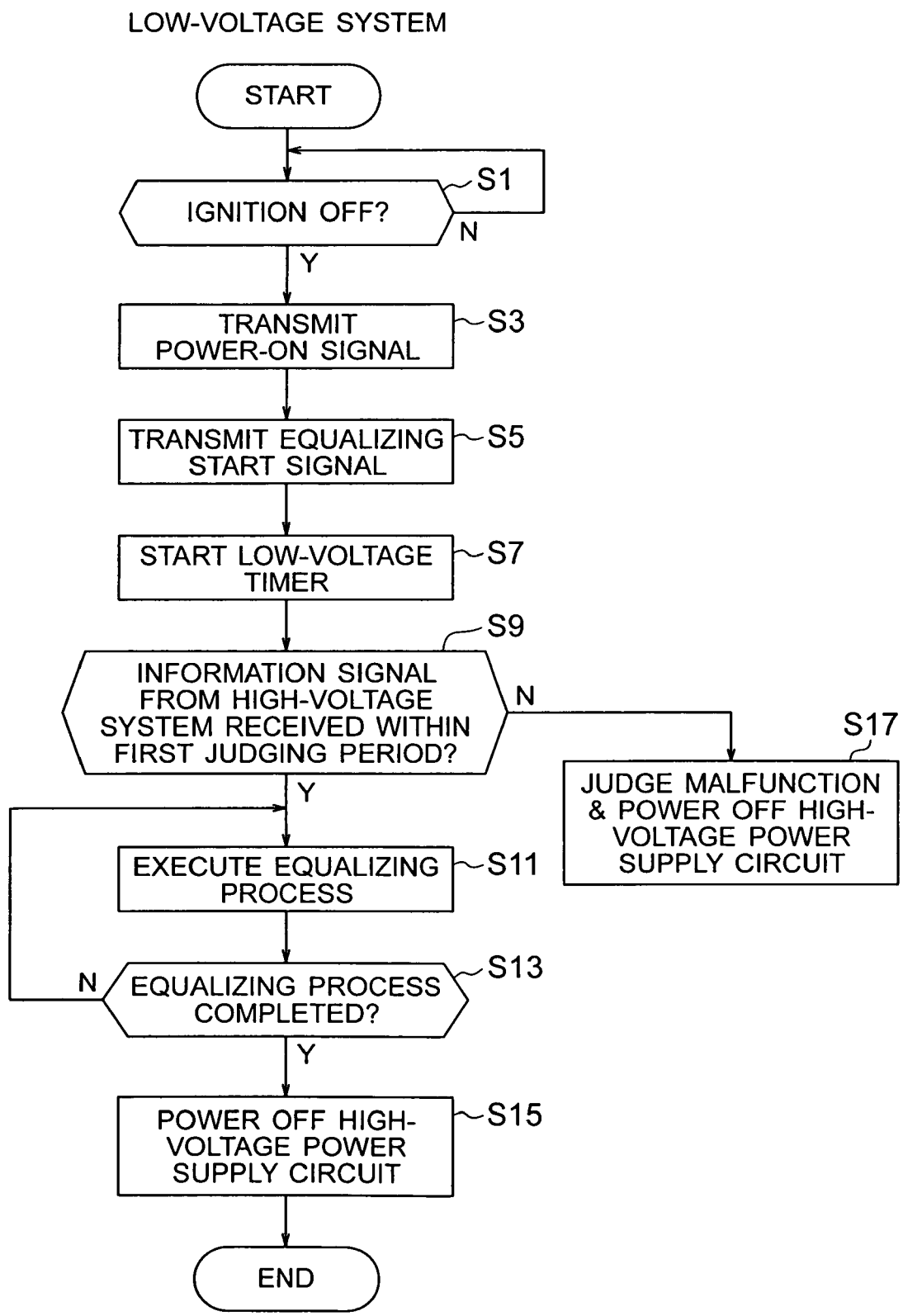
FIG. 3 is a flowchart showing actions in a low-voltage system of the voltage adjusting apparatus shown in FIG. 1.
Figure 4:
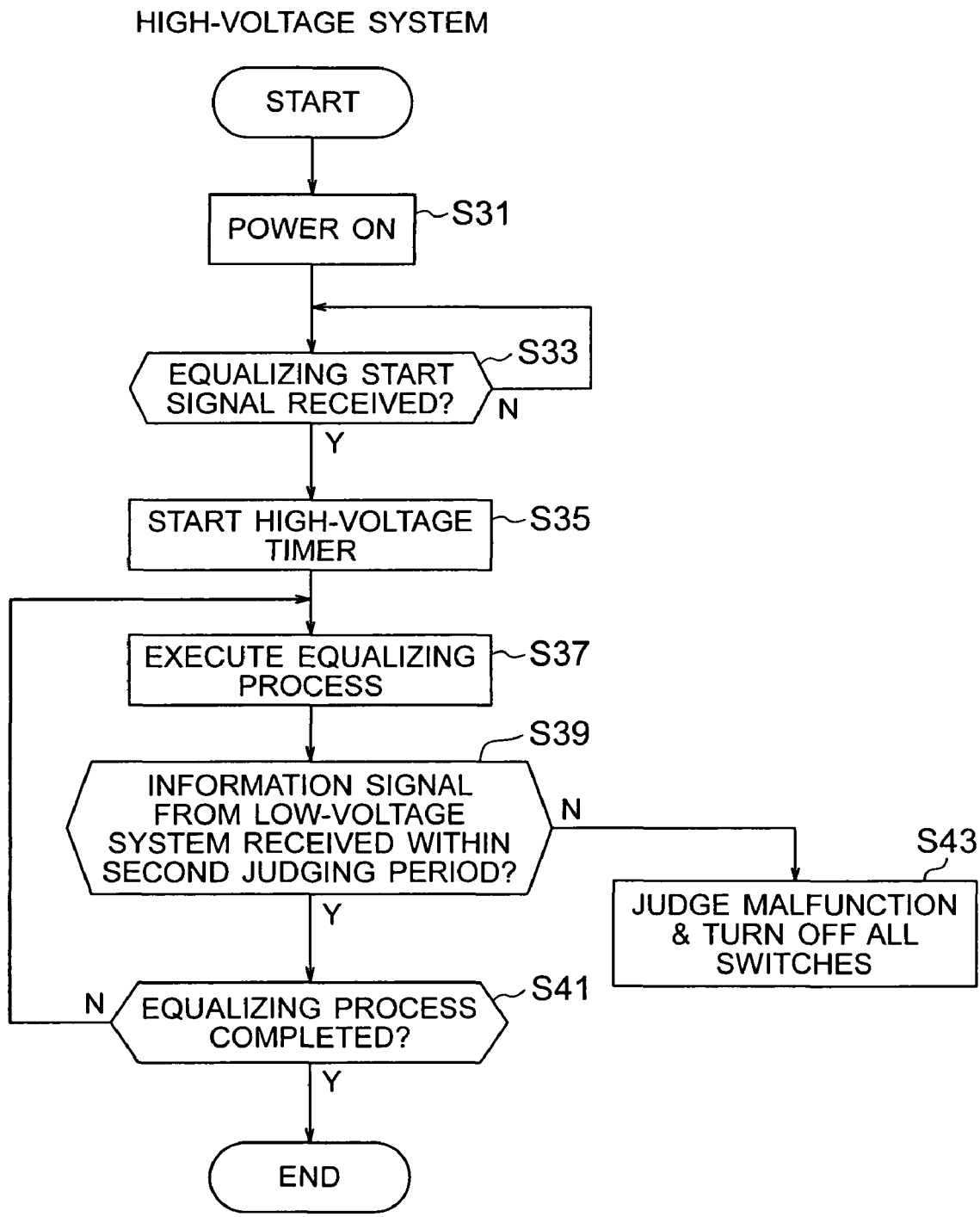
FIG. 4 is a flowchart showing actions in a high-voltage system of the voltage adjusting apparatus shown in FIG. 1.

Hereafter, actions of the voltage adjusting apparatus having above structure will be described with reference to FIGS. 3, 4. FIG. 3 is a flowchart showing actions of the low-voltage system, and FIG. 4 is a flowchart showing actions of the high-voltage system.

Firstly, the actions of the low-voltage system will be described. As shown in FIG. 3, the microcomputer at the low-voltage control circuit 20 judges whether or not an ignition switch (not shown) is turned off (Step S1). When it is judged that the ignition switch is turned off, the microcomputer transmits a power-on signal instructing to make the high-voltage power supply circuit 40 power on through the transmitting line L13, the isolating unit 70 and the transmitting line L23 to the high-voltage power supply circuit 40 (Step S3).

Next, the CPU transmits an equalizing start signal instructing to start an equalizing process by the equalizing circuit through the transmitting line L1, the isolating unit 60 and the receiving line L22 to the voltage detecting circuit D1 (Step S5). Then, the CPU makes the timer 30 start (Step S7). The timer 30 is to count a first malfunction judging period predetermined for judging whether or not a time spending the equalizing process in the low-voltage control circuit 20 is normal. The CPU judges whether or not a normal reply from each voltage detecting circuit D1-Dm at the high-voltage system is received during counting the time (Step S9). It is judged that the normal reply from the high-voltage system is received when the voltage detecting circuits D1-Dm at the high-voltage system detect each voltage value by receiving the equalizing start signal, and each voltage detect signal transmitted through the transmitting line L21, the isolating unit 60 and the receiving line L12 is received by the CPU.

The CPU acts the equalizing process (Step S11). In the equalizing process, an adjust signal, which acts the equalizing circuit connected with a unit cell having a large dispersion of SOC according to the received voltage detect signals, is generated and the adjust signal is transmitted through the transmitting line L11, the isolating unit 60 and the receiving line L22 to the voltage detecting circuits D1-Dm.

The CPU judges whether or not the equalizing process is completed (Step S13). It is judged that the equalizing process is completed when the low-voltage control circuit 20 receives a completion signal showing completion of the equalizing process from the voltage detecting circuit D1-Dm. When the equalizing process is not completed, the process goes back to Step S11. When the equalizing process is completed, the CPU transmits a power-off signal through the transmitting line L13, the isolating unit 70 and the receiving line L23 to the high-voltage power supply circuit 40 to control the high-voltage power supply circuit 40 power off (Step S15) and stops a process of the low-voltage system.

In Step S9, when the normal reply from the voltage detecting circuit D1-Dm is not received during counting the time by the low-voltage timer 30, the CPU judges that the voltage detecting circuit D1-Dm is malfunctioned, and transmits a power-off signal through the transmitting line L13, the isolating unit 70 and the receiving line L23 to the high-voltage power supply circuit 40 to control the high-voltage power supply circuit 40 power off (Step S17).

Actions of the high-voltage system will be described hereafter. As shown in FIG. 4, the high-voltage power supply circuit 40 is switched power on by the power-on signal transmitted through the transmitting line L13, the isolating unit 70 and the receiving line L23 from the low-voltage control circuit 20 (Step S31). Thereby, the voltage detecting circuits D1-Dm are activated. The microcomputer of the high-voltage control circuit 80 in the voltage detecting circuit D1 judges whether or not the equalizing start signal to be transmitted from the microcomputer of the low-voltage control circuit 20 is received (Step S33). When the equalizing start signal is not received, the process returns to Step S33. When the equalizing start signal is received, the microcomputer starts the high-voltage timer 50 (Step S35). The high-voltage timer 50 counts a second malfunction judging period, which is predetermined for judging whether or not a time required for the equalizing process in the high-voltage control circuit 80 is normal.

The microcomputer executes the equalizing process (Step S37). In the equalizing process, the unit cell C1 and the unit cell C2 are selected in order from among the select switch group SWG in the voltage detecting circuit D1, and a voltage value between both electrodes of the selected unit cell is detected by the differential amplifier A1 and the A/D converter ADC, and the detected voltage detect signal is transmitted from the microcomputer in the high-voltage control circuit 80 to the low-voltage control circuit. Other voltage detect signals detected at the other voltage detecting circuits D2-Dm are transmitted through the microcomputer in the high-voltage control circuit 80 of the voltage detecting circuit D1 to the low-voltage control circuit 20.

When an adjust signal transmitted from the low-voltage control circuit 20 thereafter corresponds to the equalizing circuit E1 of the voltage detecting circuit D1, the microcomputer of the voltage detecting circuit D1 adjusts (equalizes) the SOC by turning on the switch SW1 of the equalizing circuit E1 during a discharge time according to the adjust signal so as to connect the discharge resistor R1 with the unit cell C1 in parallel for discharging the unit cell C1.

Next, the microcomputer judges whether or not a command (that is a voltage adjust signal) from the low-voltage control circuit 20 is received within the time to be counted by the high-voltage timer 50 (Step S39). When the command (the voltage adjust signal) from the low-voltage control circuit 20 within the count time of the high-voltage timer 50 is received, the microcomputer judges whether or not the equalizing process is completed (Step S41). When a completion signal informing a completion of all equalizing actions for voltage detecting circuits D1-Dm is transmitted to the low-voltage control circuit 20, it is judged that the equalizing process is completed.

Oppositely, when the command (the voltage adjust signal) from the low-voltage control circuit 20 within the time to be counted by the high-voltage timer 50 is not received in Step S39, the microcomputer judges that the low-voltage control circuit 20 is malfunctioned, and makes all switches SW1, SW2 of the equalizing circuits E1, E2 in the voltage detecting circuits D1-Dm turn off so as to stop the equalizing process (Step S43).

Thus, the equalizing process at the high-voltage system is executed. Equalizing processes in the other voltage detecting circuit D2-Dm is the same as the equalizing process at the voltage detecting circuit D1 other than the start process of the high-voltage timer 50 in Step S35.

As mentioned above, when the voltage detect signal from the high-voltage system is not transmitted to the low-voltage control circuit 20 by, for example, a malfunction of any one of the voltage detecting circuits D1-Dm or a communication error, and thereby the equalizing process in the low-voltage control circuit 20 is not completed within the first malfunction judging period to be counted by the low-voltage timer 30, the microcomputer of the low-voltage control circuit 20 transmits the power-off signal to the high-voltage power supply circuit 40 to be switched power off. Therefore, when the equalizing actions in the equalizing circuit are unexpectedly continued by malfunction, the equalizing actions are stopped by power-off and over-discharging is prevented.

Furthermore, when the voltage adjust signal from the low-voltage system is not transmitted to the voltage detecting circuit D1-Dm by, for example, a malfunction of the low-voltage control circuit 20 or a communication error, and thereby the equalizing process in the high-voltage control circuit 80 is not completed within the second malfunction judging period to be counted by the high-voltage timer 50, the microcomputer of the high-voltage control circuit 80 makes all switches in the equalizing circuits E1, E2 at the voltage detecting circuits D1-Dm turn off. Therefore, in case of such malfunction, the equalizing actions are stopped and reliable equalizing processes can be executed.

As mentioned above, according to the first embodiment, the low-voltage control circuit 20 and the high-voltage control circuit 80 both executing equalizing processes monitor on malfunctions to each other based on times to be count by the low-voltage timer 30 and the high-voltage timer 50, so that reliable voltage adjusting apparatus can be provided in a low cost.

Second Embodiment

The second embodiment of a voltage adjusting apparatus according to the present invention is described hereafter. In the first embodiment, the equalizing circuits E1, E2 in the voltage detecting circuits D1-Dm are connected respectively to the unit cell of each block. In the second embodiment, one equalizing circuit is provided to each block and connected to one unit cell selected from a plurality of unit cells in each block.

Figure 5:
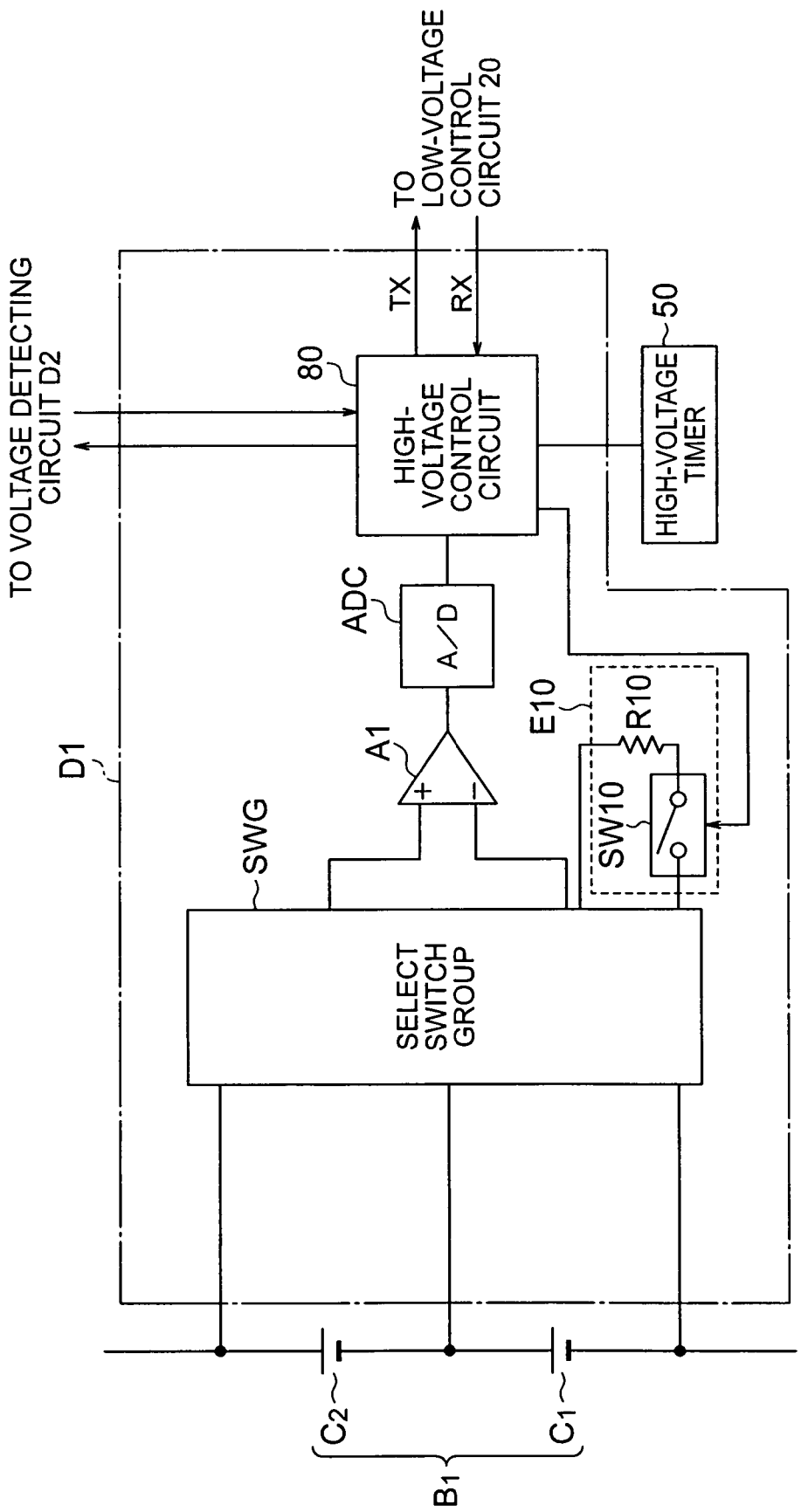
FIG. 5 is a circuit diagram of the voltage detecting circuit of a second embodiment of the voltage adjusting apparatus according to the present invention.

FIG. 5 is a circuit diagram showing an example of a structure of a voltage detecting circuit of the second embodiment of the voltage adjusting apparatus according to the present invention. The voltage detecting circuit D1 includes a select switch group SWG selecting one unit cell from among unit cells C1, C2 forming the block B1, a differential amplifier A1 detecting a voltage value between both electrodes of the one unit cell selected by the select switch group SWG, an A/D converter ADC digitally converting the voltage value detected by the differential amplifier A1, a high-voltage control circuit 80 controlling the select switch group SWG, and an equalizing circuit E10 connected selectively to both electrodes of one of unit cells C1, C2, which is selected by the select switch group SWG. The equalizing circuit E10 is structured with a discharge resistor R10 as an equalizing element, and a switch SW10 as a switch element connected with the discharge resistor R10 in series and controlled about ON/OFF by a control signal from the high-voltage control circuit 80. The voltage detecting circuits D2-Dm are structured as same as the voltage detecting circuit D1 shown in FIG. 5.

The switch SW10, similarly as the switch SW1 in the first embodiment, is controlled by the high-voltage control circuit 80 so as to be turned on according to an information signal from the low-voltage control circuit 20 in the equalizing process. When the information signal from the low-voltage control circuit 20 is not transmitted within the second malfunction judging period, the switch SW10 is controlled to be turned off.

According to the second embodiment, one equalizing circuit E10 is provided for each block so as to be connected to the one unit cell to be equalized, which is selected from among the plurality of unit cells in any one block. Thereby, the number of components can be reduced from that of the first embodiment, and the voltage adjusting apparatus can be structured in lower cost.

Although the embodiments according to the present invention has been described as mentioned above, it is understood that various changes and modifications can be made without departing from the scope of the present invention.

In the above embodiments, the equalizing circuit is formed by a discharging type of discharging the unit cell by the discharging resistor as the equalizing element. It is understood that the equalizing circuit can be formed by a charge-pump type of transferring electric charge by using a capacitor as the equalizing element.

In the embodiments mentioned above, one power supply circuit 40 is provided. It may be preferable to arrange the power supply circuit 40 respectively at each block and provide an interface circuit for transmitting the signal through the isolating unit 70 respectively to the power supply circuit 40 at each block.

In the embodiments mentioned above, the communication line for transmitting the voltage detect signal and the voltage adjust signal is provided only between the low-voltage control circuit 20 and the voltage detecting circuit D1 in the high-voltage system. Instead of this, the communication line can be preferably arranged respectively between the low-voltage control circuit 20 and each voltage detecting circuit D1-Dm.

In the embodiments mentioned above, when the command (that is the adjust signal) from the low-voltage control circuit 20 is not received within the time counted by the high-voltage timer 50 in Step S39, the microcomputer of the high-voltage control circuit 80 in Step S43 judges that the low-voltage control circuit 20 is malfunctioned, and makes all switches SW1, SW2 of the equalizing circuits E1, E2 in the voltage detecting circuits D1-Dm turn off. Instead of this, it can be preferable in Step S43 that the microcomputer judges that the low-voltage control circuit 20 is malfunctioned and makes the power supply circuit 40 power off.

The invention claimed is:

1. A voltage adjusting apparatus, comprising:
   a low-voltage system comprising,
      a low-voltage battery,
      a low-voltage power supply circuit,
      a low-voltage control unit driven by power supply through the low-voltage power supply circuit from the low-voltage battery;
   a high-voltage system comprising,
      a high-voltage battery formed with a plurality of battery unit cells and having a higher voltage value than the low-voltage battery,
      a high-voltage power supply circuit,
      an equalizing unit driven by power supply through the high-voltage power supply circuit from the high-voltage battery, and controlled by the low-voltage control unit, the equalizing unit detecting and equalizing a voltage value between both electrodes of each unit cell of the high-voltage battery as an equalizing process;
   an isolating unit isolating electrically the low-voltage system and the high-voltage system;
   a first communication line transmitting an information signal for the equalizing process between the low-voltage control unit and the equalizing unit through the isolating unit; and
   a second communication line arranged through the isolating unit between the low-voltage control unit and the high-voltage power supply circuit,
   wherein the low-voltage control unit transmits a power-off signal through the second communication line to the high-voltage power supply circuit when the information signal from the equalizing unit is not transmitted within a predetermined first malfunction judging period, and controls the high-voltage power supply circuit to be switched power off,
   wherein the equalizing unit stops the equalizing process therein when the information signal from the low-voltage control unit is not transmitted within a predetermined second malfunction judging period.

2. The voltage adjusting apparatus according to claim 1, further comprising:
   a low-voltage timer started by controlling of the low-voltage control unit to count the first malfunction judging period; and
   a high-voltage timer started by controlling of the equalizing unit to count the second malfunction judging period.

3. The voltage adjusting apparatus according to claim 1, wherein the equalizing unit comprises;

a voltage detecting circuit detecting the voltage value between the both electrodes of each unit cell of the high-voltage battery and outputting a voltage detect signal;
   an equalizing circuit connected in parallel with the unit cell and including an equalizing element and a switch element, which are connected in series; and
   a high-voltage control circuit controlling the voltage detecting circuit and the equalizing circuit,
   wherein the switch element is controlled by the high-voltage control circuit so as to be turned on corresponding to the information signal from the low-voltage control unit, and so as to be turned off when the information signal from the low-voltage control unit is not transmitted within the second malfunction judging period.

4. The voltage adjusting apparatus according to claim 1, wherein the equalizing unit comprises;
   a voltage detecting circuit detecting the voltage value between the both electrodes of each unit cell of the high-voltage battery and outputting a voltage detect signal;
   a select switch group provided at the voltage detecting circuit and selecting one unit cell from the plurality of unit cells;
   an equalizing circuit connected through the select switch group in parallel with the selected one unit cell and including an equalizing element and a switch element, which are connected in series; and
   a high-voltage control circuit controlling the voltage detecting circuit, the select switch group and the equalizing circuit,
   wherein the switch element is controlled by the high-voltage control circuit so as to be turned on corresponding to the information signal from the low-voltage control unit, and so as to be turned off when the information signal from the low-voltage control unit is not transmitted within the second malfunction judging period.

5. The voltage adjusting apparatus according to claim 1, wherein the equalizing unit stops the equaling process therein by transmitting the power-off signal to the high-voltage power supply circuit and controlling the high-voltage circuit to be switched off when the information signal from the low-voltage control unit is not transmitted within the second malfunction judging period.

6. The voltage adjusting apparatus according to claim 2, wherein the equalizing unit comprises;
   a voltage detecting circuit detecting the voltage value between the both electrodes of each unit cell of the high-voltage battery and outputting a voltage detect signal;
   an equalizing circuit connected in parallel with the unit cell and including an equalizing element and a switch element, which are connected in series; and
   a high-voltage control circuit controlling the voltage detecting circuit and the equalizing circuit,
   wherein the switch element is controlled by the high-voltage control circuit so as to be turned on corresponding to the information signal from the low-voltage control unit, and so as to be turned off when the information signal from the low-voltage control unit is not transmitted within the second malfunction judging period.

7. The voltage adjusting apparatus according to claim 2, wherein the equalizing unit comprises;
   a voltage detecting circuit detecting the voltage value between the both electrodes of each unit cell of the high-voltage battery and outputting a voltage detect signal;

a select switch group provided at the voltage detecting circuit and selecting one unit cell from the plurality of unit cells;

an equalizing circuit connected through the select switch group in parallel with the selected one unit cell and including an equalizing element and a switch element, which are connected in series; and a high-voltage control circuit controlling the voltage detecting circuit, the select switch group and the equalizing circuit, wherein the switch element is controlled by the high-voltage control circuit so as to be turned on corresponding to the information signal from the low-voltage control unit, and so as to be turned off when the information signal from the low-voltage control unit is not transmitted within the second malfunction judging period.

8. The voltage adjusting apparatus according to claim 2, wherein the equalizing unit stops the equaling process therein by transmitting the power-off signal to the high-voltage power supply circuit and controlling the high-voltage circuit to be switched off when the information signal from the low-voltage control unit is not transmitted within the second malfunction judging period.

9. The voltage adjusting apparatus according to claim 3, wherein the low-voltage control unit and the high-voltage control circuit respectively include each microcomputer.

10. The voltage adjusting apparatus according to claim 4, wherein the low-voltage control unit and the high-voltage control circuit respectively include each microcomputer.

* * * * *